United States Patent [19]

Rabitsch

[11] Patent Number: 4,729,212
[45] Date of Patent: Mar. 8, 1988

[54] PROTECTIVE COVER FOR COMBINE SKID PLATES

[76] Inventor: Thermon D. Rabitsch, P.O. Box 349, Monticello, Ga. 31064

[21] Appl. No.: 908,615

[22] Filed: Sep. 18, 1986

[51] Int. Cl.$^4$ .................. A01D 34/04; A01D 45/02
[52] U.S. Cl. ................................... 56/119; 56/17.4; 56/DIG. 24
[58] Field of Search ........ 56/119, 17.4, 208, DIG. 24, 56/17.2, 6, 13.6, 320.1

[56] References Cited

U.S. PATENT DOCUMENTS

| | | | |
|---|---|---|---|
| 4,103,476 | 8/1978 | Oosterling et al. | 56/13.6 |
| 4,403,467 | 9/1983 | Baugh | 56/119 |
| 4,476,667 | 10/1984 | Moss | 56/119 |
| 4,497,161 | 2/1985 | Vissers et al. | 56/13.6 |
| 4,591,174 | 5/1986 | White | 280/28 |
| 4,633,656 | 1/1987 | Willinger | 56/6 |

OTHER PUBLICATIONS

Poly Tech Industries, Inc.-Brochure, (Jan. 29, 1986).

Primary Examiner—Paul J. Hirsch
Assistant Examiner—Vincent Ciamacco
Attorney, Agent, or Firm—Mason, Fenwick & Lawrence

[57] ABSTRACT

A cover for use on the outer surface of a skid plate of a combine grain head, the skid plate comprising a plurality of side-by-side skid plate panels of different widths, comprising a plurality of side-by-side cover panels, each cover panel corresponding to a specific skid plate panel and each cover panel having an outer surface, an inner surface, opposed leading and trailing edges, and a pair of opposed side edges. The inner surface of each cover panel is configured to matingly engage the outer surface of its corresponding skid plate panel, while the outer surface of each said cover panel is substantially parallel to its inner surface. The side edges of each said cover panel are slightly inset from the side edges of its corresponding skid plate panel, whereby each cover panel is spaced apart from its adjacent cover panel to permit relative horizontal movement between adjacent cover panels and their corresponding skid plate panels. The cover panels are made from a material having a low coefficient of friction to resist the adhesion of soil thereto. A method for preventing soil from adhering to the skid plate of a combine comprises positioning and holding the cover panel against its corresponding skid plate panel with the inner surface of the cover panel matingly engaging the skid plate panel and attaching the cover panel to its corresponding skid plate panel. Preferably, the cover panel is attached to its corresponding skid plate panel first along the leading edge of the skid plate panel and last along the trailing edge of the skid plate panel.

19 Claims, 8 Drawing Figures

U.S. Patent   Mar. 8, 1988   Sheet 1 of 4   4,729,212
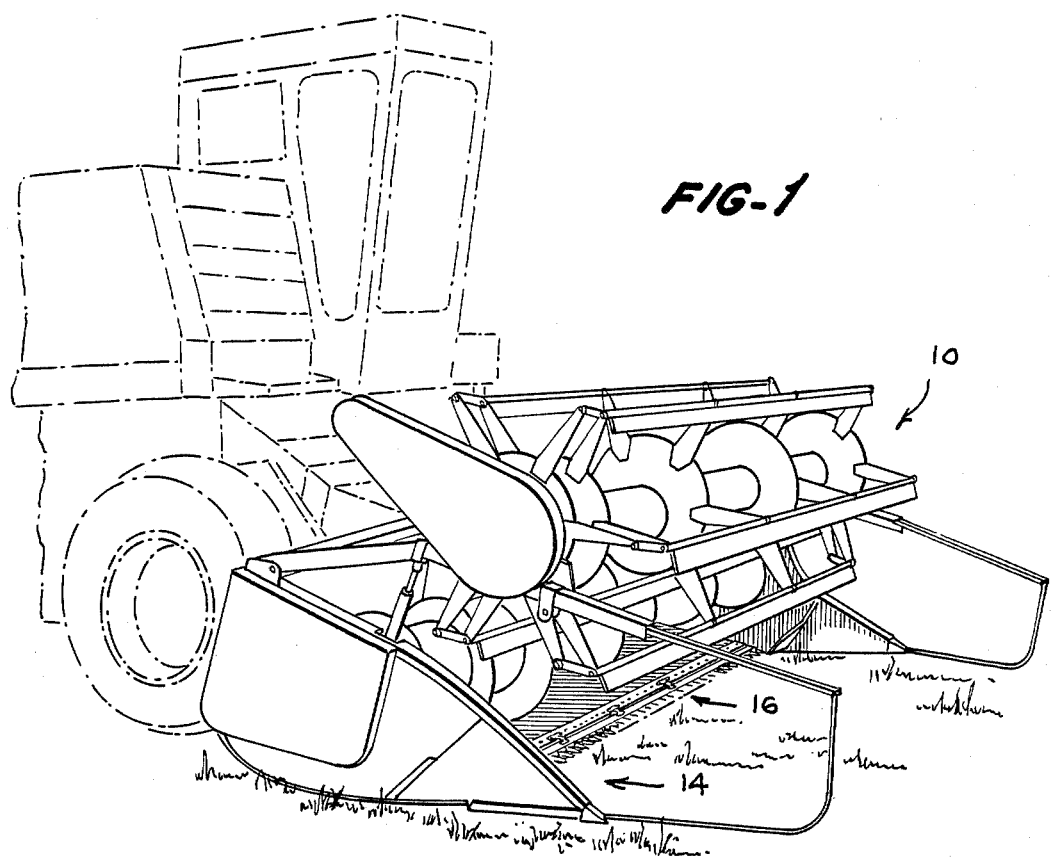
FIG-1
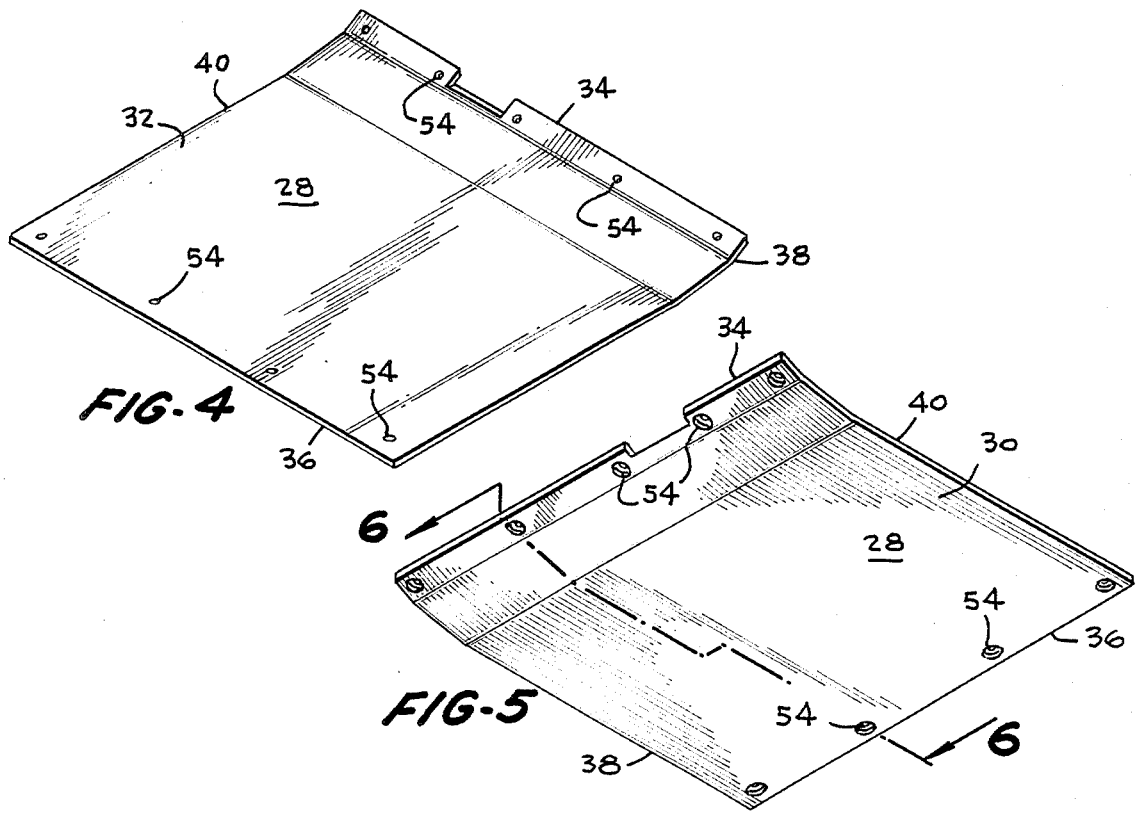
FIG-4
FIG-5

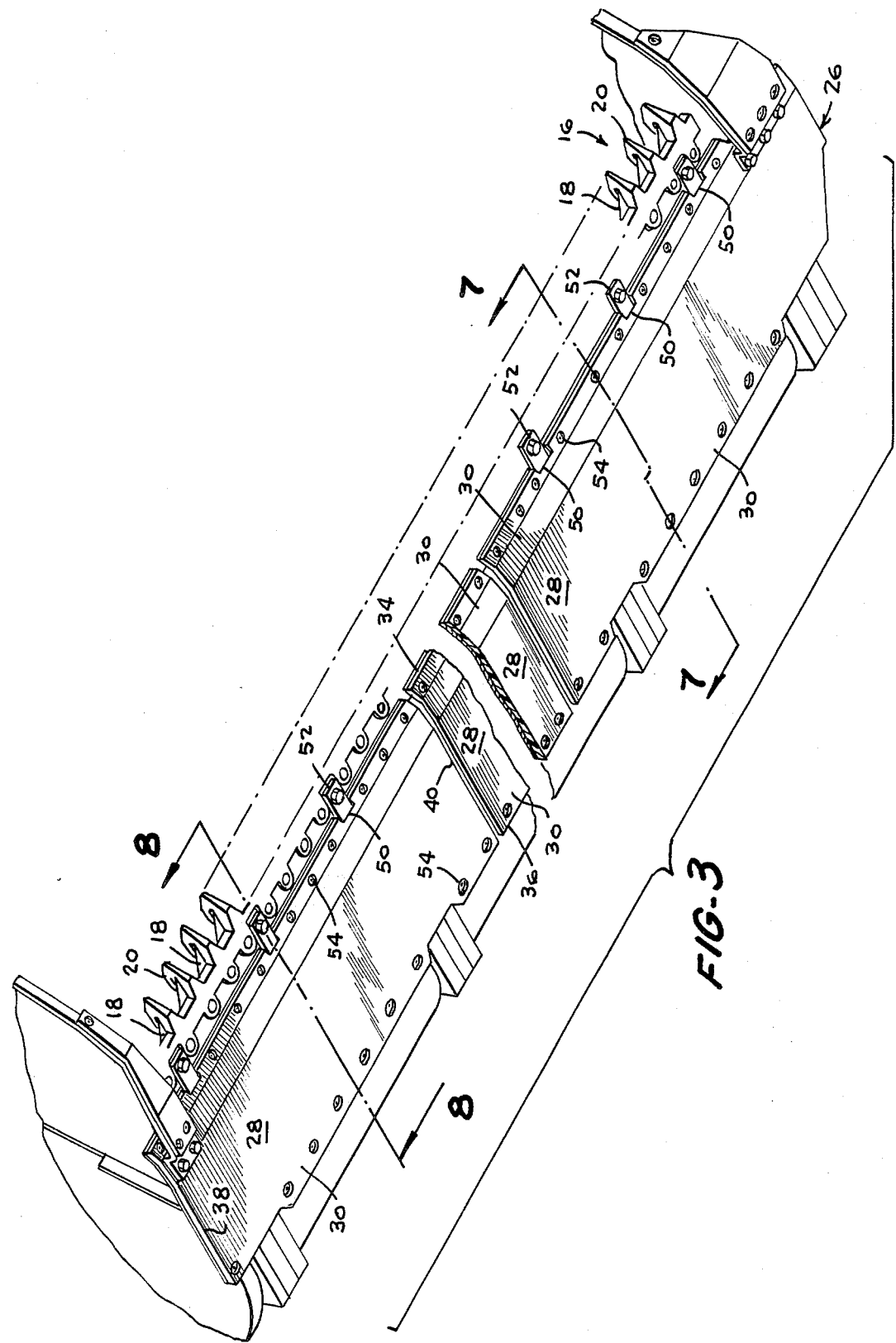

PROTECTIVE COVER FOR COMBINE SKID PLATES

BACKGROUND OF THE INVENTION

The present invention is directed to the field of combine skid plates or shoes for agricultural equipment, and is more specifically directed to a protective cover for such skid plates or shoes for preventing adhesion of soil thereto and the damage caused thereby.

Referring now to FIG. 1, there is shown a self-propelled combine 10. For purposes of illustration, a combine Model 215 manufactured by John Deere is shown. However, the invention is applicable to all makes of combines.

Referring now to FIGS. 1-3 combine 10 includes a grain head 14 for harvesting crops such as soy beans or other beans or wheat or other small grains. Grain head 14 in turn comprises a substructure (not shown), a cutterbar assembly 16 including cutter knives 18 mounted on the front of the substructure for horizontal reciprocating motion, guides or guards 20 mounted on the front of the substructure between and extending forward of cutter knives 18, and a skid plate or shoe 22 mounted on the bottom of the sub-structure rearwardly of cutter knives 18 and guards 20.

As can be seen from FIG. 2, skid plate 22 comprises multiple panels 24 of varying widths and shapes. These panels 24 are made of steel. When new, their outer surfaces are smooth and resist adhesion by the soil as combine 10 is driven forward to harvest the crops. However, as the steel begins to rust after exposure from moisture due to use in the field, the outer surfaces of panels 24 become worn and rough causing soil to adhere to them. The higher the clay content of the soil, the more the soil will adhere. As the soil adheres, it begins to accumulate in front of cutterbar assembly 16 like a plough. This soil is then fed into cutterbar assembly 16 and from there into the cleaning apparatus of combine 10 where it becomes mixed with the crops. Also, because of increased friction between skid plate 22 and the soil on crops, increased power is needed to push combine 10, thus increasing the fuel consumption of combine 10. In order to avoid these problems, the farmer has to keep stopping the combine to clean cutterbar assembly 16 and skid plate 22.

Alternatively the farmer can use combine 10 with head 14 raised above the surface of the ground. Although raising head 14 above the surface of the ground is less time consuming than stopping periodically to clean cutterbar assembly 16 and skid plate 22, it prevents combine 10 from harvesting low-lying crops. This is a particular problem with soy beans, which are harvested after the leaves fall off. The falling leaves act as a mulch, preventing the soil from drying, so that the soil adheres to skid plate 22 in great quantities. As a practical matter, combine 10 must be operated with head 14 off of the ground. This results in harvesting less than all of the crops, and in a loss of 2 to 5 bushels per acre. It is the solution of these and other problems to which the present invention is directed.

SUMMARY OF THE INVENTION

Therefore, it is a primary object of this invention to provide a cover for use with combine skid plates which prevents adhesion of soil thereto.

It is another object of this invention to provide a method for installing a protective skid plate cover.

These and other objects of this invention are achieved by the provision of a cover for use on the outer surface of the skid plate comprising a plurality of side-by-side cover panels corresponding in number to the number of skid plate panels. Each cover panel corresponds to a specific one of the skid plate panels and has an inner surface configured to matingly engage the outer surface of its corresponding skid plate panel and an outer surface substantially parallel to its inner surface. The side edges of each cover panel are slightly inset from the side edges of its corresponding skid plate panel, whereby each cover panel is spaced apart from its adjacent cover panel to permit relative horizontal movement between adjacent cover panels and their corresponding skid plate panels. The cover panels are made from a material having a low co-efficient of friction, such as an ultra-high molecular weight polyethylene plastic.

The method of the invention comprises positioning and holding each cover panel against its corresponding skid plate panel with the inner surface matingly engaging the skid plate panel, and attaching the cover panel to its corresponding skid plate panel. In attaching the cover panel to its corresponding skid plate panel, the cover panel preferably is attached to the leading edge of the skid plate panel first and to the trailing edge of the skid plate panel last.

A better understanding of the disclosed embodiments of the invention will be achieved when the accompanying detailed description is considered in conjunction with the appended drawings, in which like reference numerals are used for the same parts as illustrated in the different figures.

BRIEF DESCRIPTION OF THE DRAWINGS

FIG. 1 is a perspective view of a self-propelled combine;

FIG. 3 is a bottom perspective view of a skid plate cover according to the invention mounted on a skid plate;

FIG. 4 is a perspective view of the inner surface of a panel of the skid plate cover of the invention;

FIG. 5 is a perspective view of the outer surface of a panel of the skid plate cover of the invention;

DESCRIPTION OF THE PREFERRED EMBODIMENTS

Figure 2:
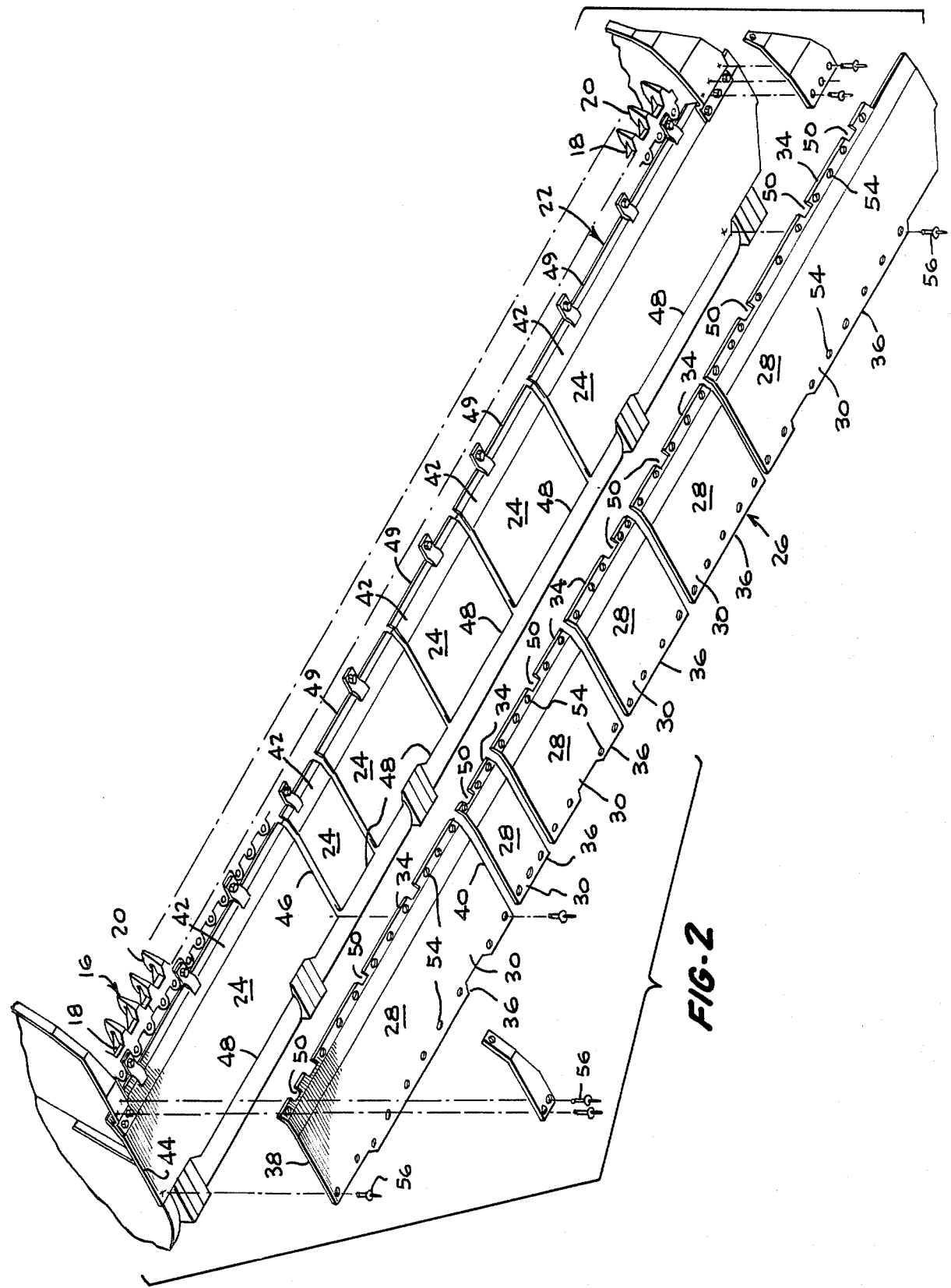
FIG. 2 is an exploded bottom perspective view of a skid plate cover according to the invention in association with a combine skid plate.
Figure 6:
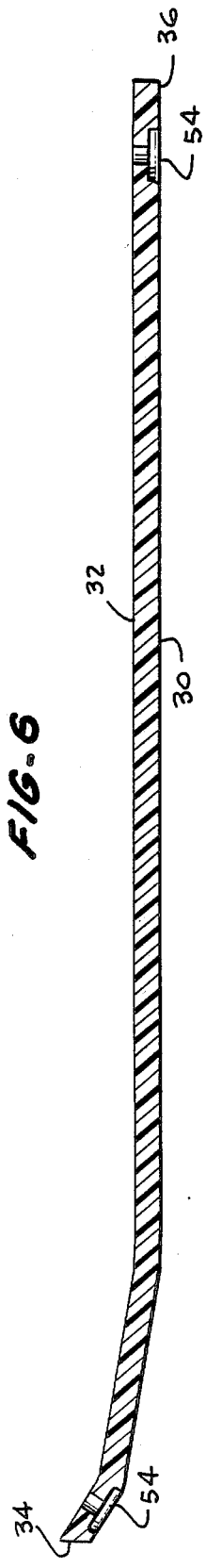
FIG. 6 is a cross-sectional view of the panel of FIG. 5, taken along line 6—6 of FIG. 5.

Referring now to FIGS. 2-8, there is shown a preferred embodiment of the invention specifically adapted for use with a John Deere combine Model 215 in which the reference numeral 26 refers to a combine skid plate cover according to the invention. Cover 26 comprises a plurality of side-by-side cover panels 28 of different sizes, the number of panels 28 depending upon the specific combine platform skid plate on which it is to be used. Cover 26 can be used on either rigid or flexible platforms.

Each manufacturer of combines makes several different widths of combines, using a combination of standard (for that manufacturer) skid plate panels of different widths (and sometimes different depths). The widest combine made by a manufacturer generally will include at least one of all of that manufacturer's standard skid plate panels, while the smaller combines will include combinations of less than all of its standard skid plate panels. By manufacturing a cover panel according to the invention corresponding to each size of skid plate panel made by a particular manufacturer, it is possible to provide a cover 26 for any size combine of that manufacturer. For skid plate 22 illustrated in FIG. 2, there are six skid plate panels 24 of varying widths, and correspondingly, six cover panels 28, each cover panel 28 corresponding to a specific one of the skid plate panels 24.

Each cover panel 28 has an outer surface 30, an inner surface 32, opposed leading and trailing edges 34 and 36, and a pair of opposed side edges 38 and 40. The inner surface 32 of each cover panel 28 is configured to matingly engage the outer surface 42 of its corresponding skid plate panel 24. The outer surface 30 of each cover panel 28 is then substantially parallel to inner surface 32 to preserve the configuration of outer surface 42 of each skid plate panel 24.

As shown in FIGS. 2 and 3, the side edges 44 and 46 of skid plate panels 24 are in some cases overlapping and in other cases spaced-apart in order to accommodate movement between skid plate panels 24 as head 14 moves over uneven ground. The side edges 38 and 40 of each cover panel 28 are inset slightly (generally from ¼ to ½ inch) from the side edges 44 and 46 of its corresponding skid plate panel 24 in order that adjacent cover panels 28 are spaced apart from each other to permit relative horizontal movement between them and their corresponding skid plate panels 24.

Figure 7:
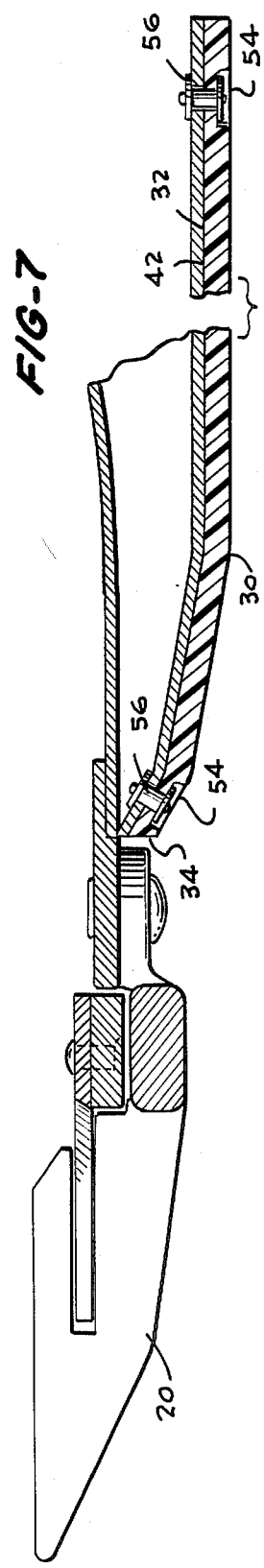
FIG. 7 is a cross-sectional view of the cover and skid plate of FIG. 3, taken along line 7—7 of FIG. 3.
Figure 8:
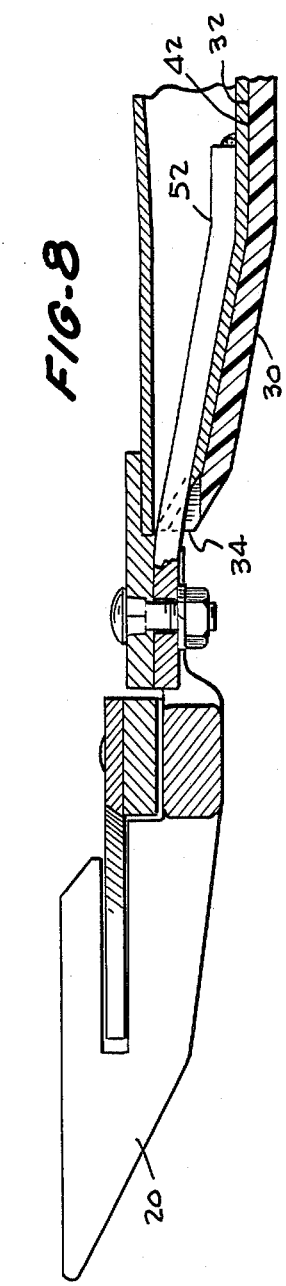
FIG. 8 is a cross-sectional view of the cover and skid plate of FIG. 3, taken along line 8—8 of FIG. 3.

As best shown in FIG. 2, preferably, the trailing edge 36 of each cover panel 28 will substantially coincide with the trailing edge 48 of its corresponding skid plate panel 24. However, the leading edge 34 of each cover panel 28 must be adapted to provide a clearance for the substructure on which the cutterbar assembly 16 is mounted. The manner in which this is accomplished depends upon the structure of the specific head 14. For example, I have found that for John Deere combines such as combine 10 shown in FIGS. 1-3, 7, and 8, it is preferable to conclude the leading edge 34 at the leading edge 49 of its corresponding skid plate panel 24 and to provide notches 50 in leading edges 34 to accommodate skid plate attachment plates 52 used to bolt skid plate panels 24 to cutterbar assembly 16 and also as shown in FIG. 7 to cut leading edges 34 at an angle to clear guides 20. In contrast, International Harvester provides a lip under the cutterbar assembly of its grain head, and I have found that it is therefore preferable for an International Harvester grain head to shape the leading edge of the cover panels to conclude at this lip. Similar adaptations must be made for combines made by other manufacturers.

The skid plate cover according to my invention must be made from a material which has a low coefficient of friction, so that soil will not adhere to it, but which also is extremely abrasion and impact resistant so that it will not deteriorate quickly from regular use. A material which possesses these qualities and is particularly well suited to molding in the necessary shape is polyethylene plastic. Preferably, ultra high molecular weight polyethylene plastic in ¼ inch sheets is used. This material has 5 million molecules per cubic inch, and is rendered extremely abrasion and impact resistant because of this ultra high molecular weight.

Virgin ultra high molecular weight polyethylene is white in color. I have found it desirable to add to the material a yellow pigment. This pigment is ultra violet stabilized so that the material with the pigment added lasts longer outside, thus enhancing the wearability over the unpigmented virgin material. Adding this pigment to virgin polyethylene plastic also enhances wearability of that material. The ultra high molecular weight polyethylene with the pigment added is commercially available from Solidur Plastics Co., in Pittsburgh, Pa. under the trade name Solidur 10-602.

The pigmented ultra high molecular weight polyethylene is converted from a flat sheet to the required profile for a cover panel 28 by a cold forming operation using a press brake. The position of notches 50 and holes 54 are then marked on a template table. Notches 50 are cut with a router, while holes 54 are drilled with a drill press. Preferably, the holes are drilled and counterbored in the same operation.

In order to attach cover panels 28 to their corresponding skid plate panels 24, a standard pattern of predrilled holes 54 is provided along leading and trailing edges 34 and 36 for receiving attachment means such as rivets 56. Intermediate rows of holes can also be provided between the rows of holes 54 along leading and trailing edges 34 and 36. It is critical that holes 54 be placed along leading and trailing edges 34 and 36 (and where applicable, intermediate edges 34 and 36) so as to avoid the substructure (not shown) to which skid plate panels 24 are mounted.

Preferably, 3/16 steel rivets are used to attach cover panels 28, and holes 54 are drilled to accommodate such rivets. Holes 54 thus are counterbored so that the heads of rivets 56 are below outer surface 30, which is the wear surface of cover panels 28.

In accordance with the invention, a method is provided for attaching cover panels 28 to their corresponding skid plate panels 24 as follows. The steel skid plate panels must first be cleaned with a wire brush or the like. Then, cover panels 28 are laid out under the corresponding skid plate panels 24. Beginning at the leading edge 34 under cutterbar assembly 16, the first cover panel is positioned on its corresponding skid plate panel 24 and held in place. The cover panel 28 can be held in place by hand (by a second party) or by C clamps on the leading and trailing edges to lightly hold the cover panel 28 against skid plate panel 24. Then, doing the leading edge first, the installer center punches, drills, and pulls the rivet for each hole 54 in the cover panel. If the cover panel has intermediate rows of holes, the installer center punches, drills, and rivets those holes next. The row of holes in the trailing edge is done last. I have found that this pattern of working from front to back results in the best fit of cover panels 28 to skid plate panels 24. The same procedure is followed for each cover panel, always preferably working from front to back. I have found that it is best to drill the holes in skid plate panels 28 with a split point drill bit to prevent the drill bit from walking. Because a feature of my invention is that the cover panels are predrilled with a standard hole pattern, replacement cover panels 28 can be fitted to their corresponding skid plate panels 28 without the necessity of redrilling the skid plate panels 28.

Thus, it will be seen that the present invention eliminates the adhesion of soil to the skid plate, thereby enabling the skid plate to be operated as low to the ground as possible so that all crops can be harvested, reducing the power required to push the combine and therefore reducing fuel consumption of the combine, and extending the life of the skid plate. Moreover, installation of the skid plate cover is easy to accomplish so as to render use of the invention convenient to users. While preferred embodiments of the invention have been disclosed it should be understood that the spirit and scope of the invention is to be limited solely by the appended claims, since numerous modifications of the disclosed embodiments will undoubtedly occur to those of skill in the art.

I claim:

1. A cover for use on the outer surface of a skid plate of a combine grain head, the skid plate being mounted on a substructure, and the skid plate comprising a plurality of side-by-side skid plate panels of different widths, and each skid plate panel having an outer surface, opposed leading and trailing edges, and a pair of opposed side edges, said cover comprising:

a plurality of side-by-side cover panels, each said cover panel corresponding to a specific one of the plurality of skid plate panels and each said cover panel configured to matingly engage the outer surface of its corresponding skid plate panel, each said cover panel having an outer surface, an inner surface, opposed leading and trailing edges, and a pair of opposed side edges, said outer surface of each said cover panel being substantially parallel to said inner surface thereof, said side edges of each said cover panel being configured to permit relative horizontal movement between adjacent cover panels and their corresponding skid plate panels, and said leading edge of each said cover panel being configured and being positioned with respect to the leading edge of its corresponding skid plate panel to provide clearance for the substructure, said cover panels being made from a material having a low coefficient of friction, whereby said cover panels will resist the adhesion of soil thereto.

2. The cover of claim 1, said trailing edge of each said cover panel being configured to substantially coincide with the trailing edge of its corresponding skid plate panel.

3. The cover of claim 1, said material being a polyethylene plastic.

4. The cover of claim 1, said material being ultra high molecular weight polyethylene plastic.

5. The cover of claim 4, said plastic having incorporated therein an ultra-violet stabilized pigment.

6. The cover of claim 1, each said cover panel being provided with a plurality of holes in a standard pattern for receiving attachment means for attaching said cover panel to its corresponding skid plate panel.

7. The cover of claim 6, said holes being positioned to avoid the substructure on which the skid plate is mounted.

8. The cover of claim 6, wherein the holes are counterbored.

9. A cover for use on the outer surface of a skid plate of a combine grain head, and the skid plate comprising a plurality of side-by-side skid plate panels of different widths, and each skid plate panel having an outer surface, opposed leading and trailing edges, and a pair of opposed side edges, said cover comprising:

a plurality of side-by-side cover panels, each said cover panel corresponding to a specific one of the plurality of skid plate panels and each said cover panel having an outer surface, an inner surface, opposed leading and trailing edges, and a pair of opposed side edges, said inner surface of each said cover panel configured to matingly engage the outer surface of its corresponding skid plate panel, said outer surface of each said cover panel being substantially parallel to said inner surface thereof, said side edges of each said cover panel being slightly inset from the side edges of its corresponding skid plate panel, whereby each said cover panel is spaced apart from its adjacent cover panel to permit relative horizontal movement between adjacent cover panels and their corresponding skid plate panels, said cover panels being made from a material having a low coefficient of friction, whereby said cover panels will resist the adhesion of soil thereto.

10. The cover of claim 9, said trailing edge of each said cover panel being configured to substantially coincide with the trailing edge of its corresponding skid plate panel.

11. The cover of claim 9, said material being a polyethylene plastic.

12. The cover of claim 9, said material being ultra high molecular weight polyethylene plastic.

13. The cover of claim 12, said plastic having incorporated therein an ultra-violet stabilized pigment.

14. The cover of claim 9, each said cover panel being provided with a plurality of holes in a standard pattern for receiving attachment means for attaching said cover panel to its corresponding skid plate panel.

15. The cover of claim 14, said holes being positioned to avoid portions of the vehicular equipment on which the skid plate is mounted.

16. The cover of claim 14, wherein the holes are counterbored.

17. A method for preventing soil from adhering to the skid plate of a combine, wherein the skid plate comprises a plurality of side-by-side skid plate panels of different widths, each skid plate having an outer surface, a leading edge and a trailing edge, said method comprising the steps of:

providing for each skid plate panel a cover panel of a material having a low coefficient of friction, the cover panel having an inner surface configured to matingly engage the outer surface of its corresponding skid plate panel and having an outer surface substantially parallel to the inner surface;

positioning and holding the cover panel against its corresponding skid plate panel with the inner surface of the cover panel matingly engaging the skid plate panel; and attaching the cover panel to its corresponding skid plate panel.

18. The method of claim 17, further comprising the steps of:

providing the cover panel with a plurality of holes in a standard pattern for receiving attaching means for attaching the cover panel to its corresponding skid plate panel, prior to said positioning and holding step; and using the cover panel as a template for providing holes in its corresponding skid plate panel for also receiving the attaching means, after said positioning and holding step.

19. The method of claim 17, said attaching step comprising attaching the cover panel to its corresponding skid plate panel first along the leading edge of the skid plate panel and along the trailing edge of the skid plate panel.

* * * * *